US012739388B2

(12) United States Patent
Hendry

(10) Patent No.: US 12,739,388 B2
(45) **Date of Patent: *Sep. 15, 2026**

(54) IMAGE CODING DEVICE AND METHOD

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,200

(22) Filed: Nov. 1, 2024

(65) Prior Publication Data

US 2025/0063175 A1 Feb. 20, 2025

Related U.S. Application Data

(63) Continuation of application No. 17/787,826, filed as application No. PCT/KR2020/019009 on Dec. 23, 2020, now Pat. No. 12,160,580.

(60) Provisional application No. 62/953,166, filed on Dec. 23, 2019.

(51) Int. Cl.

| | |
|---|---|
| ***H04N 19/132*** | (2014.01) |
| ***G06T 7/11*** | (2017.01) |
| ***G06T 7/13*** | (2017.01) |
| ***H04N 19/82*** | (2014.01) |
| ***H04N 19/86*** | (2014.01) |
| ***H04N 19/96*** | (2014.01) |

(52) U.S. Cl.

CPC .............. *H04N 19/132* (2014.11); *G06T 7/11* (2017.01); *G06T 7/13* (2017.01); *H04N 19/82* (2014.11); *H04N 19/86* (2014.11); *H04N 19/96* (2014.11)

(58) Field of Classification Search

CPC .. H04N 19/119; H04N 19/132; H04N 19/176; H04N 19/70; H04N 19/82; H04N 19/86; H04N 19/96; G06T 7/11; G06T 7/13

USPC .................................................... 375/240.12

See application file for complete search history.

(56) References Cited

U.S. PATENT DOCUMENTS

| | | | | |
|---|---|---|---|---|
| 11,647,232 B2 * | 5/2023 | Hendry | ................ | H04N 19/174 375/138 |
| 11,683,532 B2 * | 6/2023 | Hendry | .................. | H04N 19/18 375/240.12 |
| 12,101,480 B2 * | 9/2024 | Hendry | ................ | H04N 19/119 |
| 12,160,580 B2 * | 12/2024 | Hendry | ................ | H04N 19/119 |

(Continued)

FOREIGN PATENT DOCUMENTS

| | | |
|---|---|---|
| CN | 110312136 A | 10/2019 |

*Primary Examiner* — Behrooz M Senfi

(74) *Attorney, Agent, or Firm* — BRYAN CAVE LEIGHTON PAISNER LLP

(57) ABSTRACT

A (decoded) picture may be split into subpictures/tiles. Information on the subpictures may be obtained by a decoding device, and a decoding procedure may be performed on the basis of the information on the subpictures. In addition, information on the tiles may be obtained by a decoding device, and a decoding procedure may be performed on the basis of the information on the tiles. According to embodiments of the present document, subpicture-related information and tile-related information can be efficiently signaled, and an in-loop filtering procedure can be performed on the basis of the subpicture-related information.

5 Claims, 14 Drawing Sheets

(56) References Cited

U.S. PATENT DOCUMENTS

| | | | |
|---|---|---|---|
| 2013/0076770 | A1 | 3/2013 | Cheng et al. |
| 2013/0202051 | A1 | 8/2013 | Zhou |

* cited by examiner

FIG. 5

Tile 0 Slice 0
Tile 1 Slice 0
Tile 0 Slice 1
Tile 1 Slice 1

: Subpicture
: Tile
: Slice

IMAGE CODING DEVICE AND METHOD

CROSS-REFERENCE TO RELATED APPLICATIONS

This application is a Continuation of U.S. patent application Ser. No. 17/787,826, filed on Jun. 21, 2022, which is the National Stage filing under 35 U.S.C. § 371 of International Application No. PCT/KR2020/019009, filed on Dec. 23, 2020, and claims the benefit of U.S. Provisional Application No. 62/953,166, filed on Dec. 23, 2019, the contents of which are all hereby incorporated by reference herein in their entirety.

BACKGROUND OF THE DOCUMENT

Field of the Document

The present document relates to image coding apparatus and method.

Related Art

Recently, demand for high-resolution, high-quality image/video such as 4K or 8K or higher ultra-high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

SUMMARY

According to an embodiment of the present document, a method and an apparatus for increasing image/video coding efficiency are provided.

According to an embodiment of the present document, efficient filtering application method and apparatus are provided.

According to an embodiment of the present document, a method and an apparatus for efficiently applying deblocking, sample adaptive loop (SAO), and adaptive loop filtering (ALF) are provided.

According to an embodiment of the present document, in-loop filtering may be performed based on virtual boundaries.

According to an embodiment of the present document, a decoded picture may be composed of subpictures.

According to an embodiment of the present document, a signaling position of information about positions of virtual boundaries may be determined based on signaling of information about subpictures.

According to an embodiment of the present document, signaling of virtual boundary related information may be performed based on signaling of subpicture related information.

According to an embodiment of the present document, an encoding apparatus for performing video/image encoding is provided.

According to an embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

According to an embodiment of the present document, the overall image/video compression efficiency may be improved.

According to an embodiment of the present document, the subjective/objective visual quality may be increased through efficient filtering.

According to an embodiment of the present document, efficient coding can be implemented by omitting a procedure of rewriting a bitstream through virtual boundary signaling based on signaling of subpictures.

BRIEF DESCRIPTION OF THE DRAWINGS

FIG. 5 illustrates a picture according to an embodiment of the present document.

DESCRIPTION OF EXEMPLARY EMBODIMENTS

Figure 1:
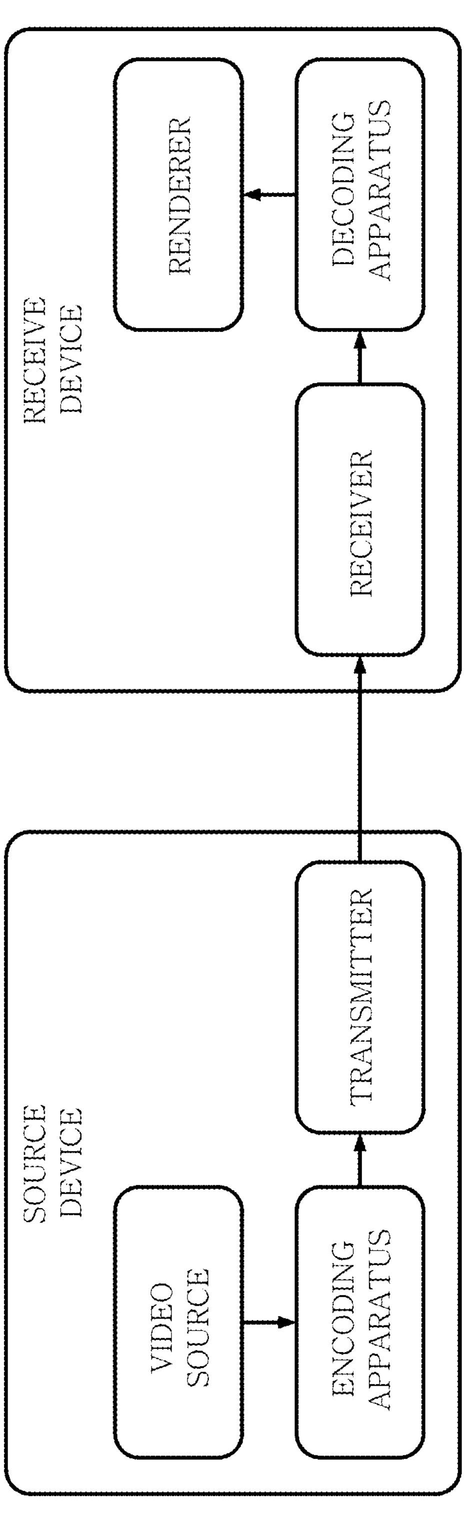
FIG. 1 schematically shows an example of a video/image coding system to which embodiments of the present document may be applied.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

Each configuration of the drawings described in the present document is an independent illustration for convenience in explanation of functions as different features, and does not mean that each configuration is implemented by mutually different hardware or different software. For example, two or more of the configurations can be combined to form one configuration, and one configuration can also be divided into multiple configurations. Without departing from the gist of the present document, embodiments in which configurations are combined and/or separated are included in the scope of claims.

Meanwhile, the present document may be modified in various forms, and specific embodiments thereof will be described and illustrated in the drawings. However, the embodiments are not intended to limit the present document. The terms used in the following description are used to merely describe specific embodiments, but are not intended to limit the document. An expression of a singular number includes an expression of the plural number, so long as it is clearly read differently. The terms such as "include" and "have" are intended to indicate that features, numbers, steps, operations, elements, components, or combinations thereof used in the following description exist, and it should be understood that the possibility of existence or addition of one or more different features, numbers, steps, operations, elements, components, or combinations thereof is not excluded.

Hereinafter, examples of the present embodiment will be described in detail with reference to the accompanying drawings. In addition, like reference numerals are used to indicate like elements throughout the drawings, and the same descriptions on the like elements will be omitted.

The present document relates to video/image coding. For example, methods/embodiments disclosed in the present document may be related to the versatile video coding (VVC) standard (ITU-T Rec. H.266), the next-generation video/image coding standard after VVC, or other video coding related standards (e.g., high efficiency video coding (HEVC) standard (ITU-T Rec. H.265), essential video coding (EVC) standard, AVS2 standard, and the like).

The present document suggests various embodiments of video/image coding, and the above embodiments may also be performed in combination with each other unless otherwise specified.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

FIG. 1 schematically shows an example of a video/image coding system to which embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
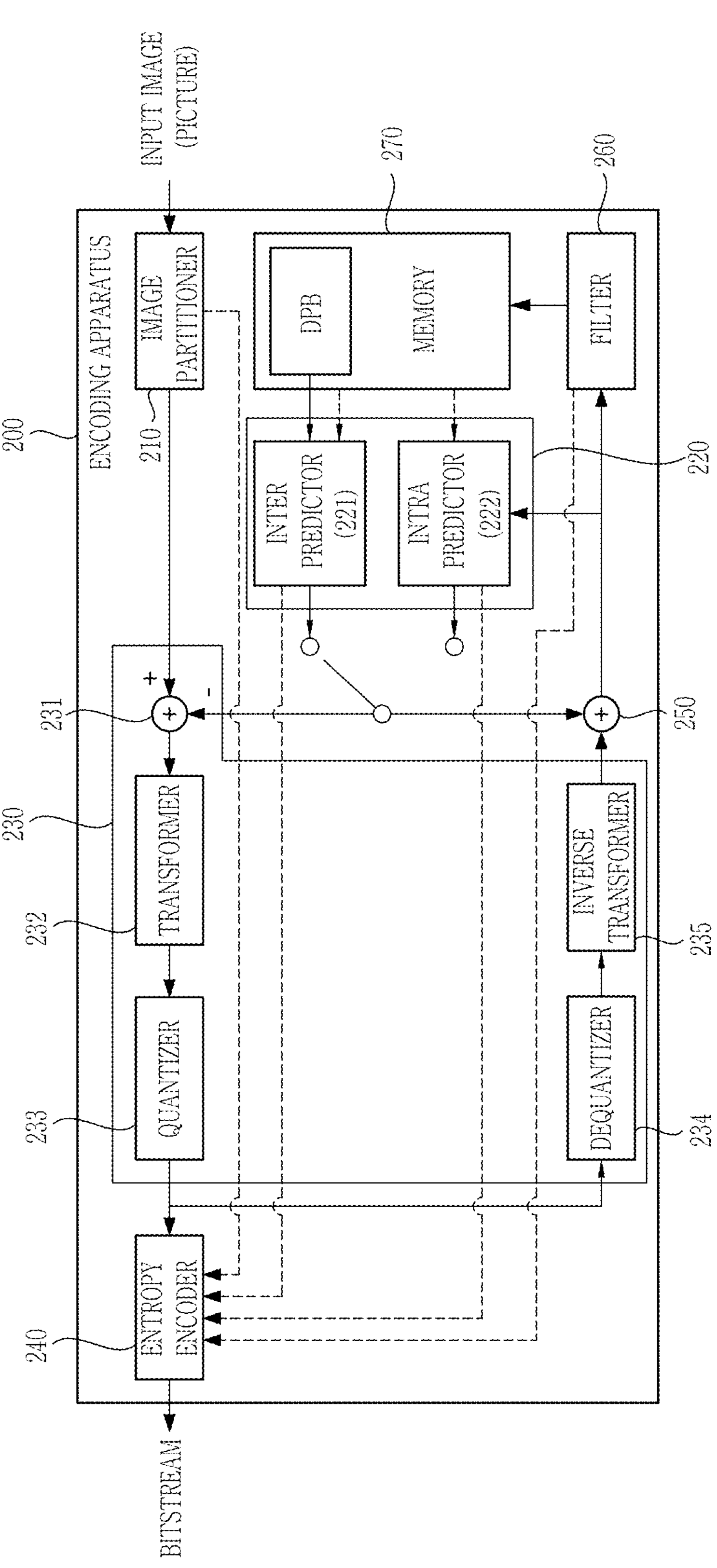
FIG. 2 is a view schematically illustrating the configuration of a video/image encoding apparatus to which embodiments of the present document may be applied.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a predictor (PU) or a transform unit (TU). In this case, each of the predictor and the transform unit may be split or partitioned from the aforementioned final coding unit. The predictor may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
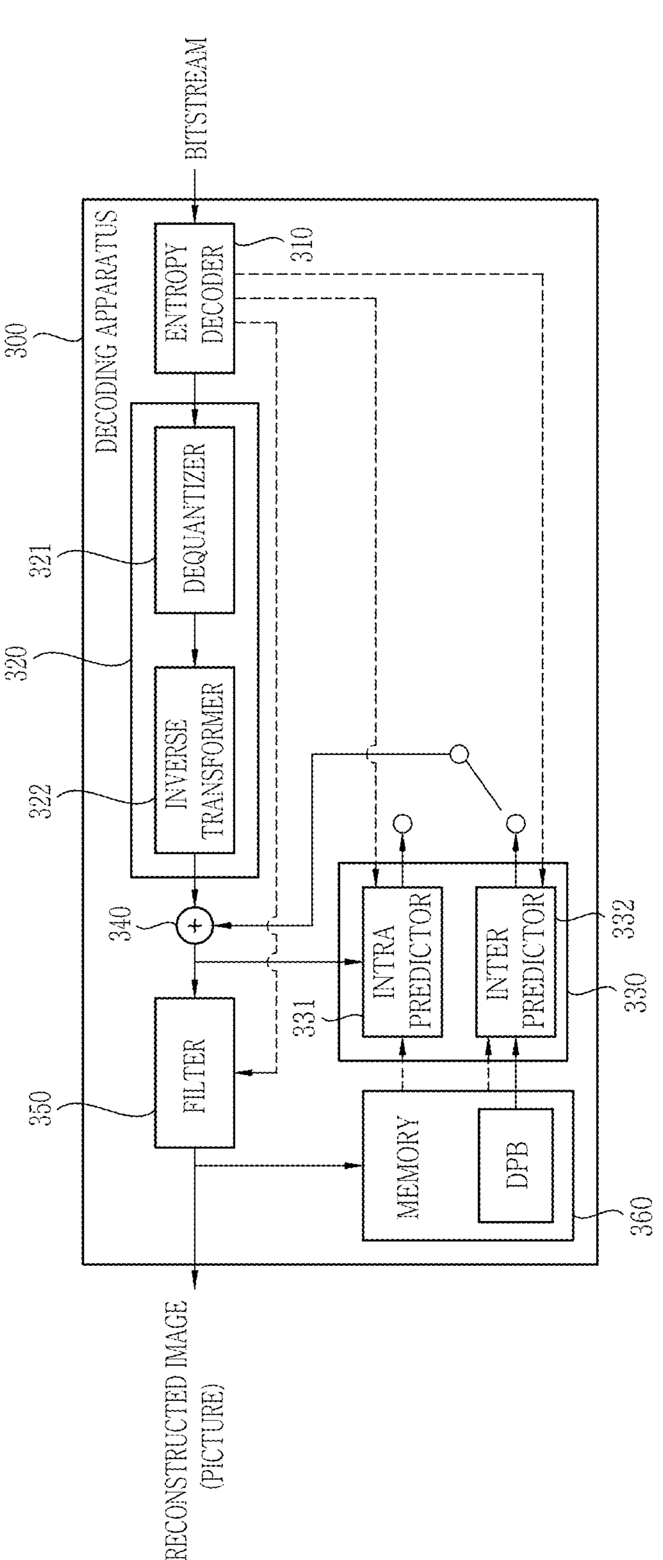
FIG. 3 is a view schematically illustrating the configuration of a video/image decoding apparatus to which embodiments of the present document may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

The predictor of the encoding apparatus/decoding apparatus may derive prediction samples by performing inter prediction in units of blocks. Inter prediction can be a prediction derived in a manner that is dependent on data elements (e.g., sample values or motion information, and the like) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled.

The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
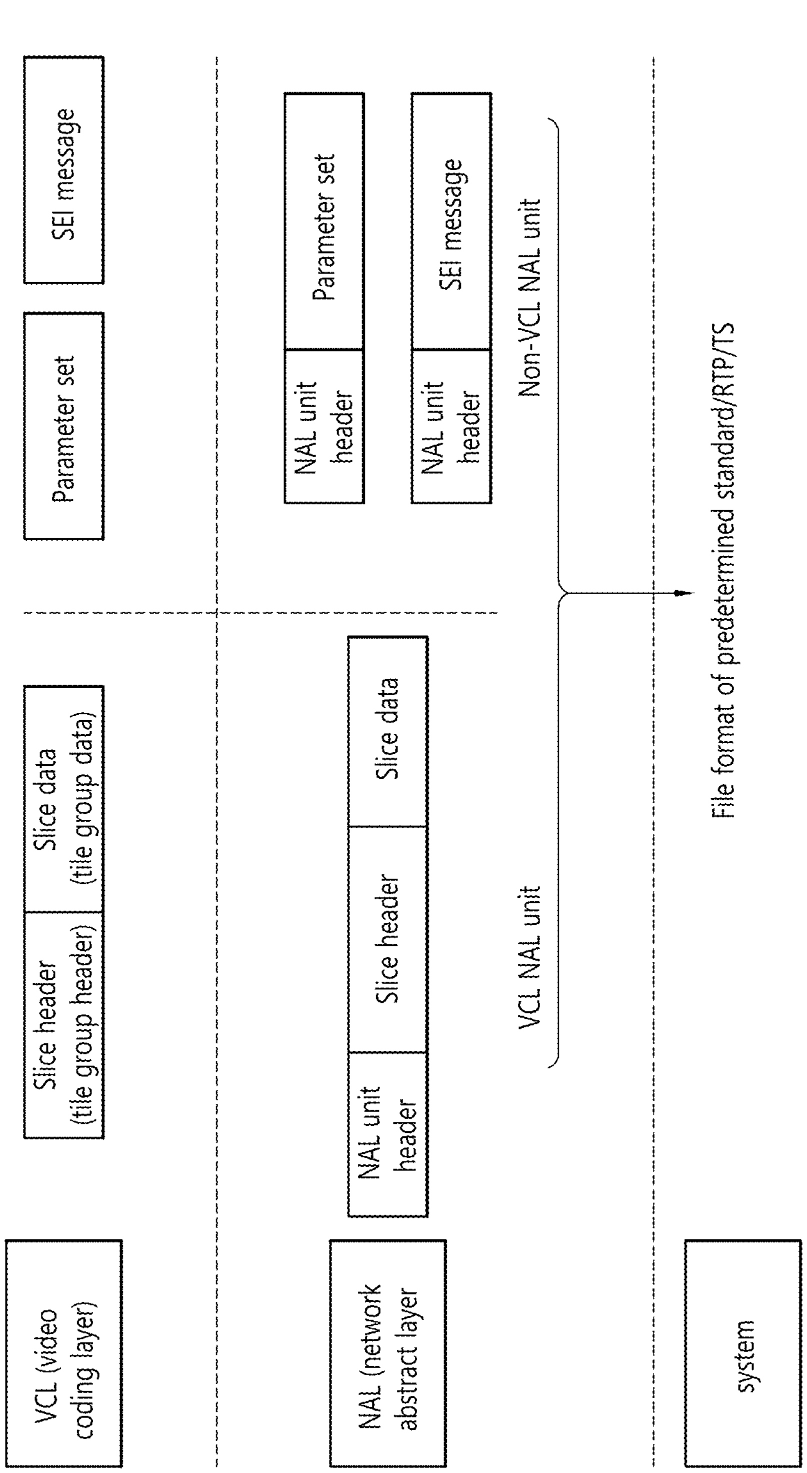
FIG. 4 exemplarily shows a hierarchical architecture for a coded video/image.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc., or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc., generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc., and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a slice may be mixed or replaced with a tile group. Also, in the present document, a slice header may be mixed or replaced with a type group header.

The slice header (slice header syntax or slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In the present document, high level syntax (HLS) may include at least one of the APS syntax, PPS syntax, SPS syntax, VPS syntax, DPS syntax, picture header syntax, and slice header syntax.

In the present document, the image/video information encoded in the encoding apparatus and signaled in the form of a bitstream to the decoding apparatus may include, as well as picture partitioning-related information in the picture, intra/inter prediction information, residual information, in-loop filtering information, etc., the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, in order to compensate for a difference between an original image and a reconstructed image due to an error occurring in a compression encoding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Hereinafter, a detailed description of picture reconstruction and filtering will be described. In the image/video coding, the reconstructed block may be generated based on intra prediction/inter prediction for each block, and the reconstructed picture including the reconstructed blocks may be generated. When the current picture/slice is an I picture/slice, the blocks included in the current picture/slice may be reconstructed based only on the intra prediction. Meanwhile, when the current picture/slice is a P or B picture/slice, the blocks included in the current picture/slice may be reconstructed based on the intra prediction or inter prediction. In this case, the intra prediction may be applied to some blocks in the current picture/slice, and the inter prediction may be applied to the remaining blocks.

The intra prediction may represent a prediction for generating prediction samples for the current block based on reference samples in the picture (hereinafter, current picture) to which the current block belongs. In case that the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to the top boundary of the current block, total 2×nW samples neighboring the top-right, and one sample neighboring the top-left of the current block. Alternatively, the neighboring reference samples of the current block may include top neighboring sample of plural columns and left neighboring sample of plural rows. Alternatively, the neighboring reference samples of the current block may include total nH samples adjacent to the right boundary of the current block having a size of nW×nH, total nH samples adjacent to the right boundary of the current block, total nW samples adjacent to the bottom boundary of the current block, and one sample neighboring the bottom-right of the current block.

However, some of the neighboring reference samples of the current block may have not yet been decoded or may not be available. In this case, the decoder may configure the neighboring reference samples to be used for the prediction through substitution of available samples for the unavailable samples. Alternatively, the neighboring reference samples to be used for the prediction may be configured through interpolation of the available samples.

When the neighboring reference samples are derived, the prediction sample may be derived based on the average or interpolation of the neighboring reference samples of the current block, and (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode. Also, the prediction sample may be generated through interpolation between the first neighboring sample and the second neighboring sample located in a direction opposite to the prediction direction of the intra prediction mode of the current block based on the prediction sample of the current block among the neighboring reference samples. The above-described case may be referred to as linear interpolation intra prediction (LIP). In addition, the chroma prediction samples may be generated based on the luma samples using the linear model. This case may be called an LM mode. In addition, the temporary prediction sample of the current block may be derived based on the filtered peripheral reference samples, and the prediction sample of the current block by weighted summing the temporary prediction sample and at least one reference sample derived according to the intra prediction mode among the existing neighboring reference samples, that is, unfiltered neighboring reference samples may be derived. The above-described case may be called position dependent intra prediction (PDPC). In addition, by selecting a reference sample line having the highest prediction accuracy among the multiple neighboring reference sample lines of the current block, the prediction sample may be derived using the reference sample located in the prediction direction in the corresponding line. In this case, the intra prediction encoding may be performed by instructing (signaling) the used reference sample line to the decoding apparatus. The above-described case may be called multi-reference line (MRL) intra prediction or MRL-based intra prediction. In addition, the current block may be divided into vertical or horizontal sub-partitions to perform the intra prediction based on the same intra prediction mode, but the neighboring reference samples may be derived and used in units of the sub-partitions. That is, in this case, the intra prediction mode for the current block may be equally applied to the sub-partitions, but the intra prediction performance may be improved in some cases by deriving and using the peripheral reference samples in units of sub-partitions. This prediction method may be called intra sub-partitions (ISP) or ISP-based intra prediction. The above-described intra prediction methods may be called an intra prediction type to be distinguished from the intra prediction mode in Table of Contents 1.2. The intra prediction type may be referred to by various terms such as an intra prediction technique or an additional intra prediction mode. For example, the intra prediction type (or additional intra prediction mode, etc.) may include at least one of the above-described LIP, PDPC, MRL, and ISP. A general intra prediction method excluding a specific intra prediction type such as the LIP, PDPC, MRL, and ISP may be called a normal intra prediction type. The normal intra prediction type may be generally applied when the above specific intra prediction type is not applied, and the prediction may be performed based on the above-described intra prediction mode. Meanwhile, if necessary, the post-processing filtering may be performed on the derived prediction sample.

Specifically, the intra prediction procedure may include determining an intra prediction mode/type, deriving a peripheral reference sample, and deriving a prediction sample based on an intra prediction mode/type. In addition, if necessary, the post-processing filtering may be performed on the derived prediction sample.

A reconstructed picture modified through an in-loop filtering procedure may be generated, and the modified reconstructed picture may be output from the decoding apparatus as a decoded picture. Further, the modified reconstructed picture may be stored in a decoded picture buffer or a memory of the encoding apparatus/decoding apparatus, and then may be used as a reference picture in the inter prediction procedure when the picture is encoded/decoded. As described above, the in-loop filtering procedure may include the deblocking filtering procedure, the sample adaptive offset (SAO) procedure and/or the adaptive loop filter (ALF) procedure. In this case, one or some of the deblocking filtering procedure, the sample adaptive offset (SAO) procedure, the adaptive loop filter (ALF) procedure, and a bi-lateral filter procedure may be sequentially applied, or all of the procedures may be sequentially applied. For example, after the deblocking filtering procedure is applied to the reconstructed picture, the SAO procedure may be performed. Further, for example, after the deblocking filtering procedure is applied to the reconstructed picture, the ALF procedure may be performed. This may be performed in the same manner even by the encoding apparatus.

The deblocking filtering is a filtering technique that removes distortion occurring at a boundary between blocks in the reconstructed picture. For example, the deblocking filtering procedure may derive a target boundary from the reconstructed picture, determine a boundary strength (bS) for the target boundary, and perform the deblocking filtering for the target boundary based on the bS. The bS may be determined based on a prediction mode of two blocks adjacent to the target boundary, motion vector difference, whether the reference pictures are the same, and whether an effective coefficient that is not 0 is present.

The SAO is a method for compensating for an offset difference between the reconstructed picture and the original picture in the unit of a sample, and for example, may be applied based on types of band offset, edge offset, and the like. According to the SAO, samples are classified into different categories in accordance with the SAO types, and the offset values may be added to the respective samples based on the categories. Filtering information for the SAO may include information on whether the SAO is applied, SAO type information, and SAO offset value information. The SAO may be applied to the reconstructed picture after the deblocking filtering is applied.

The adaptive loop filter (ALF) is a filtering technique in the unit of a sample based on filter coefficients in accordance with the filter shape for the reconstructed picture. The encoding apparatus may determine whether to apply the ALF, the ALF shape, and/or the ALF filtering coefficient through comparison of the reconstructed picture and the original picture with each other, and may signal them to the decoding apparatus. That is, the filtering information for the ALF may include information on whether to apply the ALF, ALF filter shape information, and ALF filtering coefficient information. The ALF may also be applied to the reconstructed picture after the deblocking filtering is applied.

Figure 5:
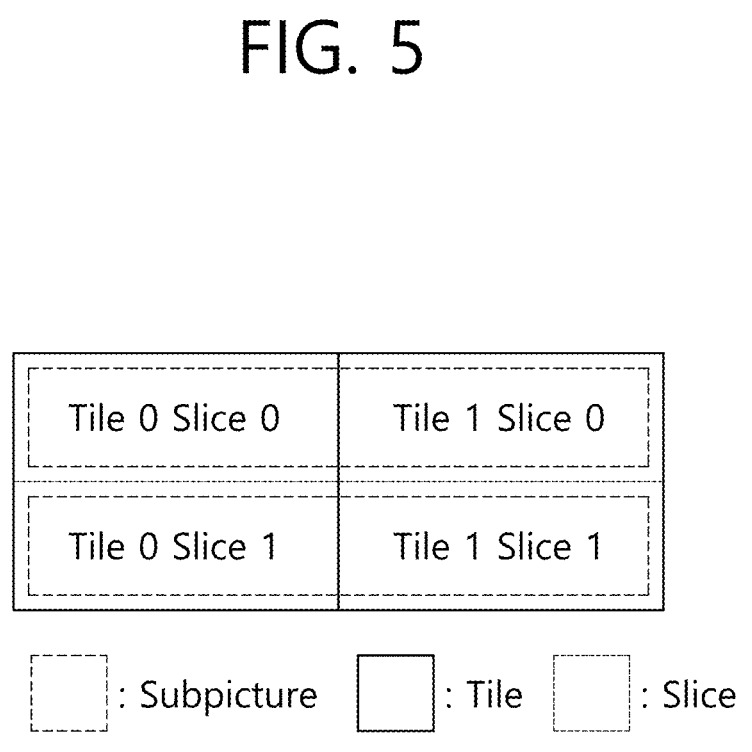

FIG. 5 illustrates a picture according to an embodiment of the present document. An exemplary picture of FIG. 5 may be divided into subpictures, slices, and tiles.

Referring to FIG. 5, a picture may be divided into subpictures. For example, the subpicture may include one or more slices. The slice may represent a rectangular area of the picture. Further, the picture may be divided into tiles. For example, a rectangular slice may include only a part (subset) of one tile. That is, in FIG. 5, two rectangular slices are within the same tile, and the two rectangular slices may belong to different subpictures. Problems that may be caused by the case of FIG. 5 and solutions thereof will be described later.

In an example, the picture/subpicture may be coded based on subpicture(s)/slice(s)/tile(s). The encoding apparatus may encode a current picture based on the subpicture/slice/tile structure, or the encoding apparatus may encode one or more subpictures (including slices/tiles) of the current picture, and may output a (sub)bitstream including (encoded) information about the subpicture. The decoding apparatus may decode one or more subpictures in the current picture based on the (sub)bitstream including the (encoded) information for the subpicture(s)/slice(s)/tile(s).

Figure 6:
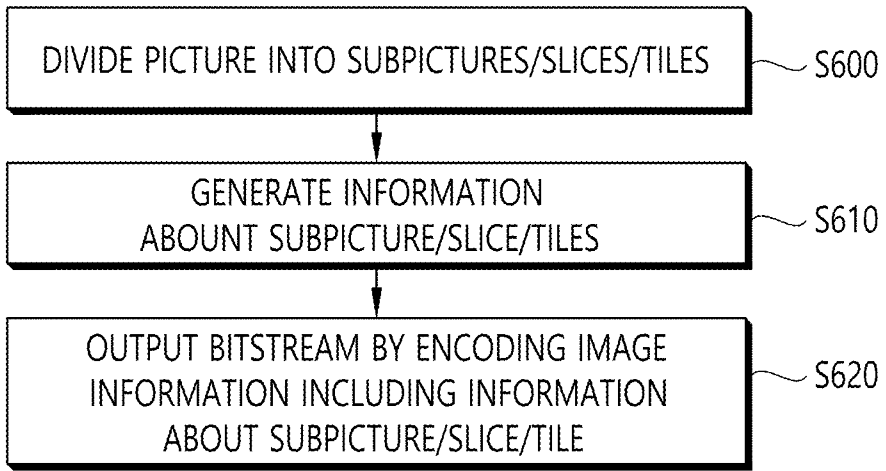
FIG. 6 illustrates a subpicture/slice/tile based encoding method according to an embodiment of the present document.

FIG. 6 illustrates a subpicture/slice/tile-based encoding method according to an embodiment of the present document.

The encoder may divide an (input) picture into a plurality of (or one or more) subpicture(s)/slice(s)/tile(s). Each subpicture may be individually/independently encoded, and a bitstream may be output. Here, the bitstream for the subpicture may be referred to as a sub-stream, subset, or sub-bitstream. Information about subpicture/slice/tile may include information/syntax element(s) described in the present document. For example, information about the slice may include information related to the number of slices being signaled for each picture/subpicture, and the width/height of the slices in the tiles. For example, information about the tile may include information related to the number of tiles (e.g., the number of tile columns and/or the number of tile rows) and information related to the size of each tile (e.g., width and/or height).

The encoder may encode one or more subpictures as information about the subpicture. The encoder may encode one or more slices/tiles as information about the slice/tile.

Figure 7:
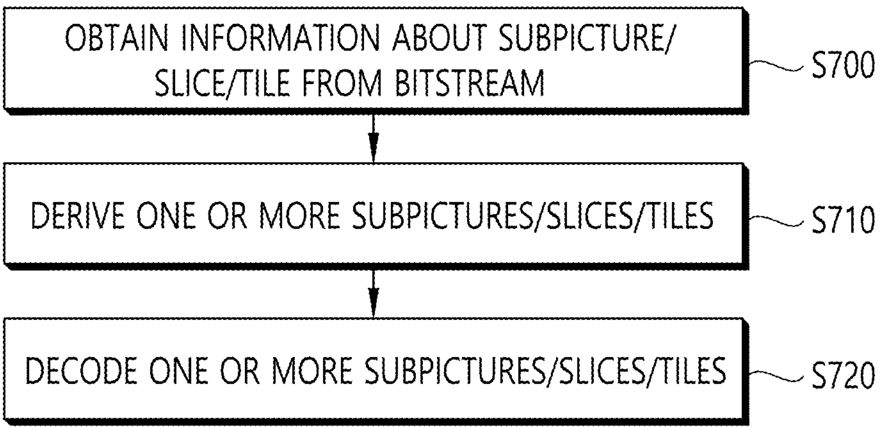
FIG. 7 illustrates a subpicture/slice/tile based decoding method according to an embodiment of the present document.

FIG. 7 illustrates a subpicture/slice/tile-based decoding method according to an embodiment of the present document.

The decoder may decode one or more subpictures (including slices/tiles), and may output one or more decoded subpicture(s) or a current picture including the subpictures. The bitstream may include sub-stream(s) or sub-bitstream(s) for the subpicture(s). As described above, the information about the subpicture/slice/tile may be configured in a high level syntax (HLS) included in the bitstream. The decoder may derive one or more subpictures based on the information about the subpicture. The decoder may derive one or more slices/tiles based on the information about the slice/tile. The decoder may decode all or some of the subpictures. The decoder may decode the subpicture (including the current block (or CU)), CTU, slice, and/or tile based on the CABAC, prediction, residual processing (transform and quantization), and in-loop filtering. Accordingly, decoded subpicture(s) may be output. The decoded subpicture(s) may include reconstructed/decoded block(s). The decoded subpictures in an output subpicture set (OPS) may be output together. As an example, if the picture is related to 360-degree or omnidirectional image/video, some of them may be rendered, and in this case, only some of all subpictures may be decoded, and some or all of the decoded subpictures may be rendered in accordance with a user viewport or viewing position. In addition, if information indicating (representing) whether in-loop filtering is enabled across subpicture boundaries is enabled, the decoder may apply the in-loop filtering procedure (e.g., deblocking filtering) with respect to the subpicture boundary positioned between two subpictures. For example, if the subpicture boundary is the same as a picture boundary, the in-loop filtering procedure for the subpicture boundaries may be applied or may not be performed.

In embodiments of the present document, the image/video information may include the HLS, and the HLS may include the information about the subpicture(s)/slice(s)/tile(s). The information about the subpicture(s) may include information representing one or more subpictures in the current picture. The information about the slice(s) may include information representing one or more slices in the current picture, subpicture, or tile. The information about the tile(s) may include information representing one or more tiles in the current picture, subpicture, or slice. The picture may include a tile including one or more slices and/or a slice including one or more tiles. Further, the picture may include a subpicture including one or more slices/tiles.

The following tables represent syntax related to the above-described picture division (subpicture/slice/tile). Information about the subpicture(s)/slice(s)/tile(s) may include syntax elements in the following tables.

The next table represents syntax of a sequence parameter set (SPS) based on the picture division (subpicture/slice/tile).

TABLE 1

| | Descriptor |
|---|---|
| seq_parameter_set_rbsp( ) { | |
| ... | |
| subpics_present_flag | u(1) |
| if( subpics_present_flag ) { | |
| sps_num_subpics_minus1 | u(8) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |
| subpic_height_minus1[ i ] | u(v) |
| subpic_treated_as_pic_flag[ i ] | u(1) |
| loop_filter_across_subpic_enabled_flag[ i ] | u(1) |
| } | |
| } | |
| ... | |
| } | |

The next table represents syntax of a picture parameter set (PPS) based on the picture division (subpicture/slice/tile).

TABLE 2

| | Descriptor |
|---|---|
| pic_parameter_set_rbsp( ) { | |
| ... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| rect_slice_flag | u(1) |
| if( rect_slice_flag ) | |
| single_slice_per_subpic_flag | u(1) |
| if( rect_slice_flag && !single_slice_per_subpic_flag ) { | |
| num_slices_in_pic_minus1 | ue(v) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 && slice_height_in_tiles_minus1[ i ] = = 0 ) { | |
| num_slices_in_tile_minus1[ i ] | ue(v) |
| numSlicesInTileMinus1 = num_slices_in_tile_minus1[ i ] | |
| for( j = 0; j < numSlicesInTileMinus1; j++ ) | |
| slice_height_in_ctu_minus1[ i++ ] | ue(v) |
| } | |
| if( tile_idx_delta_present_flag && i < num_slices_in_pic_minus1 ) | |
| tile_idx_delta[ i ] | se(v) |
| } | |
| } | |
| loop_filter_across_tiles_enabled_flag | u(1) |
| loop_filter_across_slices_enabled_flag | u(1) |
| } | |
| ... | |
| } | |

The next table represents syntax of a slice header based on the picture division (subpicture/slice/tile).

TABLE 3

| | Descriptor |
|---|---|
| slice_header( ) { | |
| ... | |
| if( rect_slice_flag \|\| NumTilesInPic > 1 ) | |
| slice_address | u(v) |
| if( !rect_slice_flag && NumTilesInPic > 1 ) | |
| num_tiles_in_slice_minus1 | ue(v) |
| ... | |
| } | |

Figure 8:
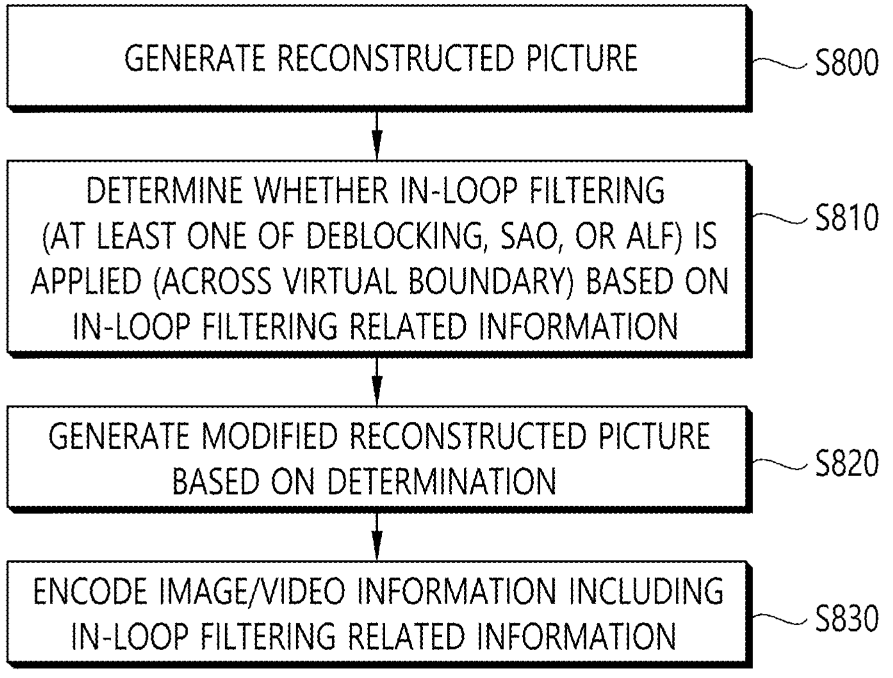
FIG. 8 is a flowchart explaining a filtering based encoding method in an encoding apparatus.

FIG. 8 is a flowchart explaining a filtering-based encoding method in an encoding apparatus. The method of FIG. 8 may include steps S800 to S830.

In step S800, the encoding apparatus may generate a reconstructed picture. The step S800 may be performed based on the above-described procedure of generating the reconstructed picture (or reconstructed samples).

In step S810, the encoding apparatus may determine whether in-loop filtering is applied (across a virtual boundary) based on in-loop filtering related information. Here, the in-loop filtering may include at least one of the above-described deblocking filtering, SAO, or ALF.

In step S820, the encoding apparatus may generate a modified reconstructed picture (modified reconstructed samples) based on the determination in step S810. Here, the modified reconstructed picture (modified reconstructed samples) may be the filtered reconstructed picture (filtered reconstructed samples).

In step S830, the encoding apparatus may encode image/video information including in-loop filtering related information based on the in-loop filtering procedure.

Figure 9:
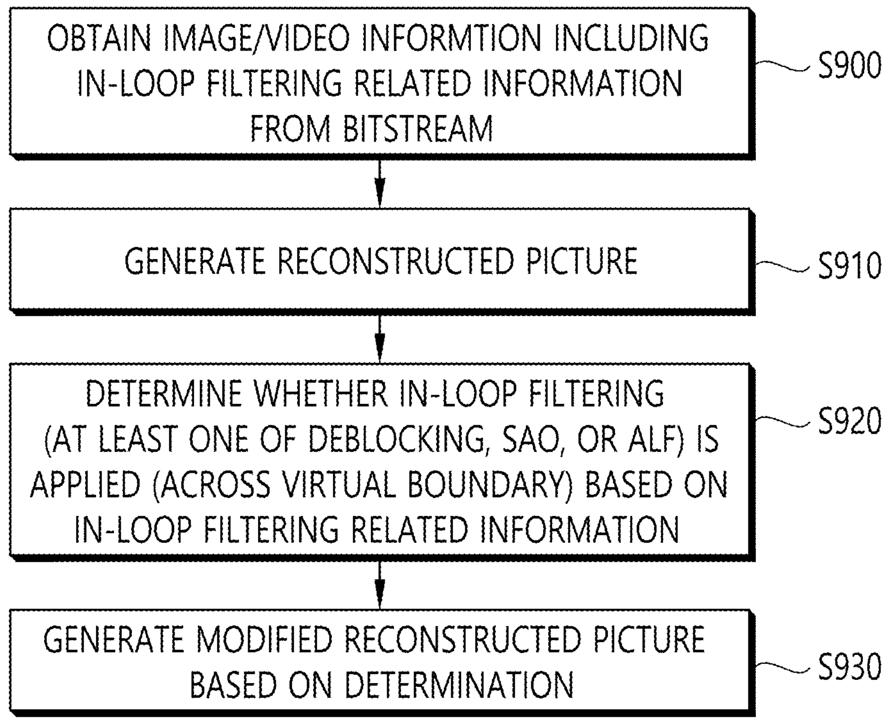
FIG. 9 is a flowchart explaining a filtering based decoding method in a decoding apparatus.

FIG. 9 is a flowchart explaining a filtering-based decoding method in a decoding apparatus. The method of FIG. 9 may include steps S900 to S930.

In step S900, the decoding apparatus may obtain image/video information including in-loop filtering related information from the bitstream. Here, the bitstream may be based on the encoded image/video information transmitted from the encoding apparatus.

In step S910, the decoding apparatus may generate a reconstructed picture. The step S910 may be performed based on the above-described procedure of generating the reconstructed picture (or reconstructed samples).

In step S920, the decoding apparatus may determine whether the in-loop filtering is applied (across the virtual boundary) based on the in-loop filtering related information. Here, the in-loop filtering may include at least one of the above-described deblocking filtering, SAO, or ALF.

In step S930, the decoding apparatus may generate the modified reconstructed picture (modified reconstructed samples) based on the determination in step S920. Here, the modified reconstructed picture (modified reconstructed samples) may be the filtered reconstructed picture (filtered reconstructed samples).

As described above, the in-loop filtering procedure may be applied to the reconstructed picture. In this case, in order to further enhance the subjective/objective visual quality of the reconstructed picture, a virtual boundary may be defined, and the in-loop filtering procedure may be applied across the virtual boundary. For example, the virtual boundary may include a discontinuous edge, such as 360-degree image, VR image, or picture in picture (PIP). For example, the virtual boundary may be present at a predetermined engaged position, and the existence/nonexistence and/or the position thereof may be signaled. As an example, the virtual boundary may be positioned on an upper fourth sample line of the CTU row (specifically for example, top of the upper fourth sample line of the CTU row). As another example, information about the existence/nonexistence and/or the position of the virtual boundary may be signaled through the HLS. As described above, the HLS may include the SPS, PPS, picture header, and slice header.

Hereinafter, high-level syntax signaling and semantics according to embodiments of the present document will be described.

An embodiment of the present document may include a method for controlling loop filters. The method for controlling the loop filters may be applied to the reconstructed picture. In-loop filters (loop filters) may be used to decode the encoded bitstreams. The loop filters may include the above-described deblocking, SAO, and ALF. The SPS may include flags related to the deblocking, SAO, and ALF, respectively. The flags may represent whether respective tools are enabled for coding of a coded layer video sequence (CLVS) and a coded video sequence (CVS) referring to the SPS.

If the loop filters are enabled for the CVS, application of the loop filters may be controlled not to cross specific boundaries. For example, whether the loop filters cross subpicture boundaries may be controlled. Further, whether the loop filters cross tile boundaries may be controlled. In addition, whether the loop filters cross virtual boundaries may be controlled. Here, the virtual boundaries may be defined on the CTUs based on the availability of a line buffer.

In relation to whether the in-loop filtering procedure is performed across the virtual boundary, the in-loop filtering related information may include at least one of an SPS virtual boundary enabled flag (virtual boundary enabled flag in the SPS), an SPS virtual boundary present flag, a picture header virtual boundary present flag, an SPS picture header virtual boundary present flag, and information about the position of the virtual boundary.

In embodiments included in the present document, the information about the position of the virtual boundary may include information about x coordinate of a vertical virtual boundary and information about y coordinate of a horizontal virtual boundary. Specifically, information about the position of the virtual boundary may include information about the x coordinate of the vertical virtual boundary and/or the y coordinate of the horizontal virtual boundary in the unit of luma samples. Further, the information about the position of the virtual boundary may include information about the number of information (syntax elements) about the x coordinate of the vertical virtual boundary that is present in the SPS. Further, the information about the virtual boundary may include information about the number of information (syntax elements) about the y coordinate of the horizontal virtual boundary that is present in the SPS. Further, the information about the position of the virtual boundary may include information about the number of information (syntax elements) about the x coordinate of the vertical virtual boundary that is present in the picture header. Further, the information about the position of the virtual boundary may include information about the number of information (syntax elements) about the y coordinate of the horizontal virtual boundary that is present in the picture header.

The following tables represent exemplary syntax and semantics of a sequence parameter set (SPS) according to the present embodiment.

TABLE 4

| | Descriptor |
|---|---|
| seq_parameter_set_rbsp( ) { | |
| ... | |
| subpics_present_flag | u(1) |
| if( subpics_present_flag ) { | |
| sps_num_subpics_minus1 | u(8) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |
| subpic_height_minus1[ i ] | u(v) |
| subpic_treated_as_pic_flag[ i ] | u(1) |
| loop_filter_across_subpic_enabled_flag[ i ] | u(1) |
| } | |
| } | |
| ... | |
| sps_sao_enabled_flag | u(1) |
| sps_alf_enabled_flag | u(1) |
| ... | |
| sps_loop_filter_across_virtual_boundaries_disabled_present_flag | u(1) |
| if( sps_loop_filter_across_virtual_boundaries_disabled_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| ... | |
| } | |

TABLE 5

| |
|---|
| subpics_present_flag equal to 1 specifies that subpicture parameters are present in in the SPS RBSP syntax. subpics_present_flag equal to 0 specifies that subpicture parameters are not present in the SPS RBSP syntax. |
| sps_num_subpics_minus1 plus 1 specifies the number of subpictures. sps_num_subpics_minus1 shall be in the range of 0 to 254. When not present, the value of sps_num_subpics_minus1 is inferred to be equal to 0. |
| subpic_ctu_top_left_x[ i ] specifies horizontal position of top left CTU of i-th subpicture in unit of CtbSizeY. The length of the syntax element is Ceil( Log2( pic_width_max_in_luma_samples / CtbSizeY ) ) bits. When not present, the value of subpic_ctu_top_left_x[ i ] is inferred to be equal to 0. |
| subpic_ctu_top_left_y[ i ] specifies vertical position of top left CTU of i-th subpicture in unit of CtbSizeY. The length of the syntax element is Ceil( Log2( pic_height_max_in_luma_samples / CtbSizeY ) ) bits. When not present, the value of subpic_ctu_top_left_y[ i ] is inferred to be equal to 0. |
| subpic_width_minus1[ i ] plus 1 specifies the width of the i-th subpicture in units of CtbSizeY. The length of the syntax element is Ceil( Log2( pic_width_max_in_luma_samples / CtbSizeY ) ) bits. When not present, the value of subpic_width_minus1[ i ] is inferred to be equal to Ceil( pic_width_max_in_luma_samples / CtbSizeY ) − 1. |
| subpic_height_minus1[ i ] plus 1 specifies the height of the i-th subpicture in units of CtbSizeY. The length of the syntax element is Ceil( Log2( pic_height_max_in_luma_samples / CtbSizeY ) ) bits. When not present, the value of subpic_height_minus1[ i ] is inferred to be equal to Ceil( pic_height_max_in_luma_samples / CtbSizeY ) − 1. |
| subpic_treated_as_pic_flag[ i ] equal to 1 specifies that the i-th subpicture of each coded picture in the CLVS is treated as a picture in the decoding process excluding in-loop filtering operations. subpic_treated_as_pic_flag[ i ] equal to 0 specifies that the i-th subpicture of each coded picture in the CLVS is not treated as a picture in the decoding process excluding in-loop filtering operations. When not present, the value of subpic_treated_as_pic_flag[ i ] is inferred to be equal to 0. |
| loop_filter_across_subpic_enabled_flag[ i ] equal to 1 specifies that in-loop filtering operations may be performed across the boundaries of the i-th subpicture in each coded picture in the CLVS. loop_filter_across_subpic_enabled_flag[ i ] equal to 0 specifies that in-loop filtering operations are not performed across the boundaries of the i-th subpicture in each coded picture in the CLVS. When not present, the value of loop_filter_across_subpic_enabled_pic_flag[ i ] is inferred to be equal to 1. |
| sps_loop_filter_across_virtual_boundaries_disabled_present_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations. |
| sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process. |
| sps_alf_enabled_flag equal to 0 specifies that the adaptive loop filter is disabled. sps_alf_enabled_flag equal to 1 specifies that the adaptive loop filter is enabled. |
| sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0. |
| sps_virtual_boundaries_pos_x[ i ] is used to compute the value of VirtualBoundariesPosX[ i ], which specifies the location of the i-th vertical virtual boundary in units of luma samples. The value of sps_virtual_boundaries_pos_x[ i ] shall be in the range of 1 to Ceil( pic_width_in_luma_samples ÷ 8 ) − 1, inclusive. |
| sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0. |
| sps_virtual_boundaries_pos_y[ i ] is used to compute the value of VirtualBoundariesPosY[ i ], which specifies the location of the i-th horizontal virtual boundary in units of luma samples. The value of sps_virtual_boundaries_pos_y[ i ] shall be in the range of 1 to Ceil( pic_height_in_luma_samples ÷ 8 ) − 1, inclusive. |

The following tables represent exemplary syntax and semantics of a picture parameter set (PPS) according to the present embodiment.

TABLE 6

| | Descriptor |
|---|---|
| pic_parameter_set_rbsp( ) { | |
| ... | |
| no_pic_partition_flag | u(1) |
| if( !no_pic_partition_flag ) { | |
| ... | |
| loop_filter_across_tiles_enabled_flag | u(1) |
| loop_filter_across_slices_enabled_flag | u(1) |
| } | |
| ... | |
| deblocking_filter_control_present_flag | u(1) |

TABLE 6-continued

| | Descriptor |
|---|---|
| if( deblocking_filter_control_present flag ) { | |
| deblocking_filter_override_enabled_flag | u(1) |
| pps_deblocking_filter_disabled_flag | u(1) |
| if( !pps_deblocking_filter_disabled flag ) { | |
| pps_beta_offset_div2 | se(v) |
| pps_tc_offset_div2 | se(v) |
| } | |
| } | |
| ... | |
| } | |

TABLE 7 no_pic_partition_flag equal to 1 specifies that no picture partitioning applied to each picture referring to the PPS. no_pic_partition_flag equal to 0 specifies each picture referring to the PPS may be partitioned into more than one tile or slice.
loop_filter_across_tiles_enabled_flag equal to 1 specifies that in-loop filtering operations may be performed across tile boundaries in pictures referring to the PPS. loop_filter_across_tiles_enabled_flag equal to 0 specifics that in-loop filtering operations are not performed across tile boundaries in pictures referring to the PPS. The in-loop filtering operations include the deblocking filter, sample adaptive offset filter, and adaptive loop filter operations.
loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations.
deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.
deblocking_filter_override_enabled_flag equal to 1 specifies the presence of pic_deblocking_filter_override_flag in the PHs referring to the PPS or slice_deblocking_filter_override_flag in the slice headers referring to the PPS. deblocking_filter_override_enabled_flag equal to 0 specifies the absence of pic_deblocking_filter_override_flag in PHs referring to the PPS or slice_deblocking_filter_override_flag in slice headers referring to the PPS. When not present, the value of deblocking_filter_override_enabled_flag is inferred to be equal to 0.
pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.
pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

The following tables represent exemplary syntax and semantics of a picture header according to the present embodiment.

TABLE 8

| | Descriptor |
|---|---|
| picture_header_rbsp( ) { | |
| ... | |
| if( !sps_loop_filter_across_virtual_boundaries_disabled_present_flag ) { | |
| ph_loop_filter_across_virtual_boundaries_disabled_present_flag | u(1) |
| if( ph_loop_filter_across_virtual_boundaries_disabled_present_flag ) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++ ) | |
| ph_virtual_boundaries_pos_y[ i ] | u(13) |
| } | |
| } | |
| ... | |
| if( sps_sao_enabled_flag ) { | |
| pic_sao_enabled_present_flag | u(1) |
| if( pic_sao_enabled_present_flag ) { | |
| pic_sao_luma_enabled_flag | u(1) |
| if(ChromaArrayType != 0 ) | |
| pic_sao_chroma_enabled_flag | u(1) |
| } | |
| } | |
| if( sps_alf_enabled_flag ) { | |
| pic_alf_enabled_present_flag | u(1) |
| if( pic_alf_enabled_present_flag ) { | |
| pic_alf_enabled_flag | u(1) |
| if( pic_alf_enabled_flag ) { | |
| pic_num_alf_aps_ids_luma | u(3) |
| for( i = 0; i < pic_num_alf_aps_ids_luma; i++ ) | |
| pic_alf_aps_id_luma[ i ] | u(3) |
| if( ChromaArrayType != 0 ) | |
| pic_alf_chroma_idc | u(2) |
| if( pic_alf_chroma_idc ) | |
| pic_alf_aps_id_chroma | u(3) |
| } | |
| } | |
| } | |
| ... | |
| if( deblocking_filter_override_enabled_flag ) { | |

TABLE 8-continued

| | Descriptor |
|---|---|
| pic_deblocking_filter_override_present_flag | u(1) |
| if( pic_deblocking_filter_override_present_flag ) { | |
| pic_deblocking_filter_override_flag | u(1) |
| if( pic_deblocking_filter_override_flag ) { | |
| pic_deblocking_filter_disabled_flag | u(1) |
| if( !pic_deblocking_filter_disabled_flag ) { | |
| pic_beta_offset_div2 | se(v) |
| pic_tc_offset_div2 | se(v) |
| } | |
| } | |
| } | |
| } | |
| ... | |
| } | |

TABLE 9 ph_loop_filter_across_virtual_boundaries_disabled_present_flag equal to 1 specifies that the in-loop filtering operations are disabled across the virtual boundaries in pictures associated to the PH.
ph_loop_filter_across_virtual_boundaries_disable_—present_flag equal to 0 specifies that no such disabling of in-loop filtering operations is applied in pictures associated to the PH. The in-loop filtering operations include the deblocking filter, sample adaptive offset filter, and adaptive loop filter operations.
ph_num_ver_virtual_boundaries specifies the number of ph_virtual_boundaries_pos_x[ i ] syntax elements that are present in the PH.
ph_virtual_boundaries_pos_x[ i ] is used to compute the value of VirtualBoundariesPosX[ i ], which specifies the location of the i-th vertical virtual boundary in units of luma samples. The value of ph_virtual_boundaries_pos_x[ i ] shall be in the range of 1 to Ceil( pic_width_in_luma_samples ÷ 8 ) − 1, inclusive.
ph_num_hor_virtual_boundaries specifies the number of ph_virtual_boundaries_pos_y[ i ] syntax elements that are present in the PH.
ph_virtual_boundaries_pos_y[ i ] is used to compute the value of VirtualBoundariesPosY[ i ], which specifies the location of the i-th horizontal virtual boundary in units of luma samples. The value of ph_virtual_boundaries_pos_y[ i ] shall be in the range of 1 to Ceil( pic_height_in_luma_samples ÷ 8 ) − 1, inclusive.
pic_sao_enabled_present_flag equal to 1 specifies that pic_sao_luma_flag and pic_sao_chroma_flag are present in the PH. pic_sao_enabled_present_flag equal to 0 specifies that pic_sao_luma_flag and pic_sao_chroma_flag are not present in the PH. When pic_sao_enabled_present_flag is not present, it is inferred to be equal to 0.
pic_sao_luma_enabled_flag equal to 1 specifies that SAO is enabled for the luma component in all slices associated with the PH; pic_sao_luma_enabled_flag equal to 0 specifies that SAO for the luma component may be disabled for one, or more, or all slices associated with the PH.
pic_sao_chroma_enabled_flag equal to 1 specifies that SAO is enabled for the chroma component in all slices associated with the PH; pic_sao_chroma_enabled_flag equal to 0 specifies that SAO for chroma component may be disabled for one, or more, or all slices associated with the PH.
pic_alf_enabled_present_flag equal to 1 specifies that pic_alf_enabled_flag, pic_num_alf_aps_ids_luma, pic_alf_aps_id_luma[ i ], pic_alf_chroma_idc, and pic_alf_aps_id_chroma are present in the PH.
pic_alf_enabled_present_flag equal to 0 specifies that pic_alf_enabled_flag, pic_num_alf_aps_ids_luma, pic_alf_aps_id_luma[ i ], pic_alf_chroma_idc, and pic_alf_aps_id_chroma are not present in the PH. When pic_alf_enabled_present_flag is not present, it is inferred to be equal to 0.
pic_alf_enabled_flag equal to 1 specifies that adaptive loop filter is enabled for all slices associated with the PH and may be applied to Y, Cb, or Cr colour component in the slices. pic_alf_enabled_flag equal to 0 specifies that adaptive loop filter may be disabled for one, or more, or all slices associated with the PH. When not present, pic_alf_enabled_flag is inferred to be equal to 0.
pic_num_alf_aps_ids_luma specifies the number of ALF APSs that the slices associated with the PH refers to.
pic_alf_aps_id_luma[ i ] specifies the adaptation_parameter_set_id of the i-th ALF APS that the luma component of the slices associated with the PH refers to.
The value of alf_luma_filter_signal_flag of the APS NAL unit having aps_params_type equal to ALF_APS and adaptation_parameter_set_id equal to pic_alf_aps_id_luma[ i ] shall be equal to 1.
pic_alf_chroma_idc equal to 0 specifies that the adaptive loop filter is not applied to Cb and Cr colour components.
pic_alf_chroma_idc equal to 1 indicates that the adaptive loop filter is applied to the Cb colour component.
pic_alf_chroma_idc equal to 2 indicates that the adaptive loop filter is applied to the Cr colour component.
pic_alf_chroma_idc equal to 3 indicates that the adaptive loop filter is applied to Cb and Cr colour components. When pic_alf_chroma_idc is not present, it is inferred to be equal to 0.
pic_alf_aps_id_chroma specifies the adaptation_parameter_set_id of the ALF APS that the chroma component of the slices associated with the PH refers to.
pic_deblocking_filter_override_present_flag equal to 1 specifics that pic_deblocking_filter_override_flag is present in the PH. pic_deblocking_filter_override_present_flag equal to 0 specifies that pic_deblocking_filter_override_flag is not present in the PH. When pic_deblocking_filter_override_present_flag is not present, it is inferred to be equal to 0.
pic_deblocking_filter_override_flag equal to 1 specifies that deblocking parameters are present in the PH.
pic_deblocking_filter_override_flag equal to 0 specifies that deblocking parameters are not present in the PH. When not present, the value of pic_pic_deblocking_filter_override_flag is inferred to be equal to 0.
pic_deblocking_filter_disabled_flag equal to 1 specifies that the operation of the deblocking filter is not applied for the slices associated with the PH. pic_deblocking_filter_disabled_flag equal to 0 specifies that the operation of the deblocking filter is applied for the slices associated with the PH. When pic_deblocking_filter_disabled_flag is not present, it is inferred to be equal to pps_deblocking_filter_disabled_flag.

TABLE 9-continued

| |
|---|
| pic_beta_offset_div2 and pic_tc_offset_div2 specify the deblocking parameter offsets for β and tC (divided by 2) for the slices associated with the PH. The values of pic_beta_offset_div2 and pic_tc_offset_div2 shall both be in the range of −6 to 6, inclusive. When not present, the values of pic_beta_offset_div2 and pic_tc_offset_div2 are inferred to be equal to pps_beta_offset_div2 and pps_tc_offset_div2, respectively. |

The following tables represent exemplary syntax and semantics of a slice header according to the present embodiment.

TABLE 10

| | Descriptor |
|---|---|
| slice_header( ) { | |
| ... | |
| if( pps_cu_chroma_qp_offset_list_enabled_flag ) | |
| cu_chroma_qp_offset_enabled_flag | u(1) |
| if( sps_sao_enabled_flag && !pic_sao_enabled_present_flag ) { | |
| slice_sao_luma_flag | u(1) |
| if( ChromaArrayType != 0 ) | |
| slice_sao_chroma_flag | u(1) |
| } | |
| if( sps_alf_enabled_flag && !pic_alf_enabled_present_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| } | |
| } | |
| if( deblocking_filter_override_enabled_flag && !pic_deblocking_filter_override_present_flag ) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| ... | |
| } | |

TABLE 11

| |
|---|
| cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0. |
| slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to pic_sao_luma_enabled_flag. |
| slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to pic_sao_chroma_enabled_flag. |
| slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to pic_alf_enabled_flag. |
| slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is interred to be equal to the value of pic_num_alf_aps_ids_luma. |
| slice_alf_aps_id_luma[ i ] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[ i ] shall be less than or equal to the TemporalId of the coded slice NAL unit. When slice_alf_enabled_flag is equal to 1 and slice_alf_aps_id_luma[ i ] is not present, the value of slice_alf_aps_id_luma[ i ] is inferred to be equal to the value of pic_alf_aps_id_luma[ i ]. |
| The value of alf_luma_filter_signal_flag of the APS NAL unit having aps_params_type equal to ALF_APS and adaptation_parameter_set_id equal to slice_alf_aps_id_luma[ i ] shall be equal to 1. |

TABLE 11-continued

| |
|---|
| slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to pic_alf_chroma_idc. |
| slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of pic_alf_aps_id_chroma. |
| The value of alf_chroma_filter_signal_flag of the APS NAL unit having aps_params_type equal to ALF_APS and adaptation_parameter_set_id equal to slice_alf_aps_id_chroma shall be equal to 1. |
| slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to pic_deblocking_filter_override_flag. |
| slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is interred to be equal to pic_deblocking_filter_disabled_flag. |
| slice_beta_offset_div2 and slice_tc_offset_div2 specify the deblocking parameter offsets for β and tC (divided by 2) for the current slice. The values of slice_beta_offset div2 and slice_tc_offset_div2 shall both be in the range of −6 to 6, inclusive. When not present, the values of slice_beta_offset_div2 and slice_tc_offset_div2 are inferred to be equal to pic_beta_offset_div2 and pic_tc_offset_div2, respectively. |

Hereinafter, information related to subpictures, information related to virtual boundaries that can be used for in-loop filtering, and their signaling will be described.

In an example, two different rectangular slices may belong to different subpictures while sharing the same tile. In this case, a problem may arise, in which coding complexity is increased.

In order to simplify the picture division, an embodiment of the present document may include condition examples for a picture being divided into two or more subpictures. In an example, all CTUs in one tile may belong to the same subpictures. In another example, all CTUs in a subpicture may belong to the same tile. The above two examples may be applied individually for image/video coding, may be applied sequentially, or may be applied in combination. Further, in an embodiment of the present document, in case that a subpicture includes CTUs being subsets of all CTUs in one tile, the subpicture may not include the CTUs belonging to another tile.

In the signaling for the current picture, if the value of subpic_present_flag is 1, the number of subpictures in each picture referring to the SPS may be 1 (the value of sps_num_subpics_minus1 is 0). Such a condition has been made to support a subpicture extraction usage example in which a subpicture independently coded from the bitstream in order to form another bitstream even without changing values smaller than the values of parameter sets. Accordingly, even if the value of subpic_present_flag is 1, and the value of sps_num_subpics_minus1 is 0, subpic_ctu_top_left_x[0], subpic_ctu_top_left_y[0], subpic_width_minus1[0], subpic_height_minus1[0], subpic_treated_as_pic_flag[i], and/or loop_filter_across_subpic_enabled_flag[i] are still present. In such a situation, such syntax elements may be present to overlap each other, and if a signal for a wrong value is received for the corresponding syntax element, it may make the operation of the decoder unpredictable as well. For example, if the value of subpics_present_flag is 1, and the value of sps_num_subpics_minus1 is 0, this means that only one subpicture (picture itself) is present, and the value of subpic_treat_as_pic_flag[0] is equal to 1. In this case, if the corresponding value is signaled as the value of 0, a contradictory problem may occur in the decoding procedure.

In order to solve the above-described problem, an embodiment of the present document includes condition examples capable of being applied in case that subpicture signaling is present (e.g., the value of subpic_present_flag is 1), and only one subpicture is present in the picture (e.g., the value of sps_num_subpics_minus1 is 0). The above condition examples may be as in the following table.

TABLE 12

| |
|---|
| a) There signalling of the property of the only subpicture in the picture is omitted and their values are derived. In other word, syntax elements subpic_ctu_top_left_x[ 0 ], subpic_ctu_top_left_y[ 0 ], subpic_width_minus1[ 0 ], subpic_height_minus1[ 0 ], subpic_treated_as_pic_flag[ i ], and loop_filter_across_subpic_enabled_flag[ i ] in the current VVC spec is not present and their values are inferred as follows:<br>subpic_ctu_top_left_x[ 0 ] is inferred to be equal to 0<br>subpic_ctu_top_left_y[ 0 ] is inferred to be equal to 0<br>subpic_width_minus1[ 0 ] is inferred to be equal to Ceil( pic_width_max_in_luma_samples ÷ CtbSizeY ) )<br>subpic_height_minus1[ 0 ] is inferred to be equal to Ceil( pic_height_max_in_luma_samples ÷ CtbSizeY ) )<br>subpic_treated_as_pic_flag[ 0 ] is inferred to be equal to 1<br>loop_filler_across_subpic_enabled_flag[ 0 ] is inferred to be equal to 0 |
| b) The values of the subpicture's properties are constrained as follow:<br>The first CTU of the subpicture is the first CTU of the picture (i.e., subpic_ctu_top_left_x[ 0 ] is constrained to be equal to 0, subpic_ctu_top_left_y[ 0 ] is constrained to be equal to 0)<br>The width of the subpicture is the width of the picture (i.e., subpic_width_minus1[ 0 ] is constrained to be equal to Ceil( pic_width_max_in_luma_samples ÷ CtbSizeY ) )). |

TABLE 12-continued

| |
|---|
| The height of the subpicture is the height of the picture (i.e., subpic_height_minus1[ 0 ] is constrained to be equal to Ceil( pic_height_max_in_luma_samples ÷ CtbSizeY ) )). The subpicture is an independently coded subpicture (i.e., subpic_treated_as_pic_flag[ 0 ] is constrained to be equal to 1). |

In an example, in case that the subpicture signaling is present, and positions of virtual boundaries are present in a picture header, there is a problem in that the picture header should be rewritten in order to identify whether signaling of the virtual boundary position is correct in subpicture extraction and subpicture merge scenarios. This may violate the design purpose of the subpicture extraction/merge, in which the bitstream is not necessary to be rewritten for the NAL unit of the layer that is lower than that of the parameter sets.

In order to solve the above problem, according to an embodiment of the present document, if the subpicture signaling is present (e.g., if the subpicture signaling is present in the SPS), signaling of virtual boundary positions may not be included in the picture header. As an example, if the subpicture signaling is present, information about the positions of the virtual boundaries may be included in a high-level parameter set. For example, if the subpicture signaling is present, the information about the positions of the virtual boundaries may be included in the SPS. Further, if the subpicture signaling is present, the information about the positions of the virtual boundaries may be included in the PPS.

In an embodiment of the present document, if the subpicture ID signaling is present (if the value of sps_subpic_id_present_flag is 1), all subpictures may be independently coded subpictures (the value of subpic_treated_as_pic_flag[i] is 1). In this case, the positions (e.g., SPS, PPS, or picture header) of the subpicture ID signaling may have no relation.

According to embodiments of the present document together with the above tables, it may be determined whether virtual boundary related information (e.g., virtual boundary position related information) is signaled in the sequence parameter set based on whether the subpicture information is present. For example, in case that the subpicture information is present in the corresponding sequence, the virtual boundary related information (e.g., virtual boundary position related information) may be signaled in the sequence parameter set. Accordingly, the virtual boundary based coding method according to embodiments of the present document may be efficiently performed without rewriting or changing the high-level syntax.

Further, according to embodiments of the present document, a (decoded) picture may be composed of subpictures. The information about the subpictures may be obtained by the decoding apparatus, and based on the information about the subpictures, the decoding procedure may be performed. In an example, based on the information about the subpictures, the decoding apparatus may determine the position (e.g., SPS) where the information about the positions of the virtual boundaries for the in-loop filtering is signaled.

Figure 10:
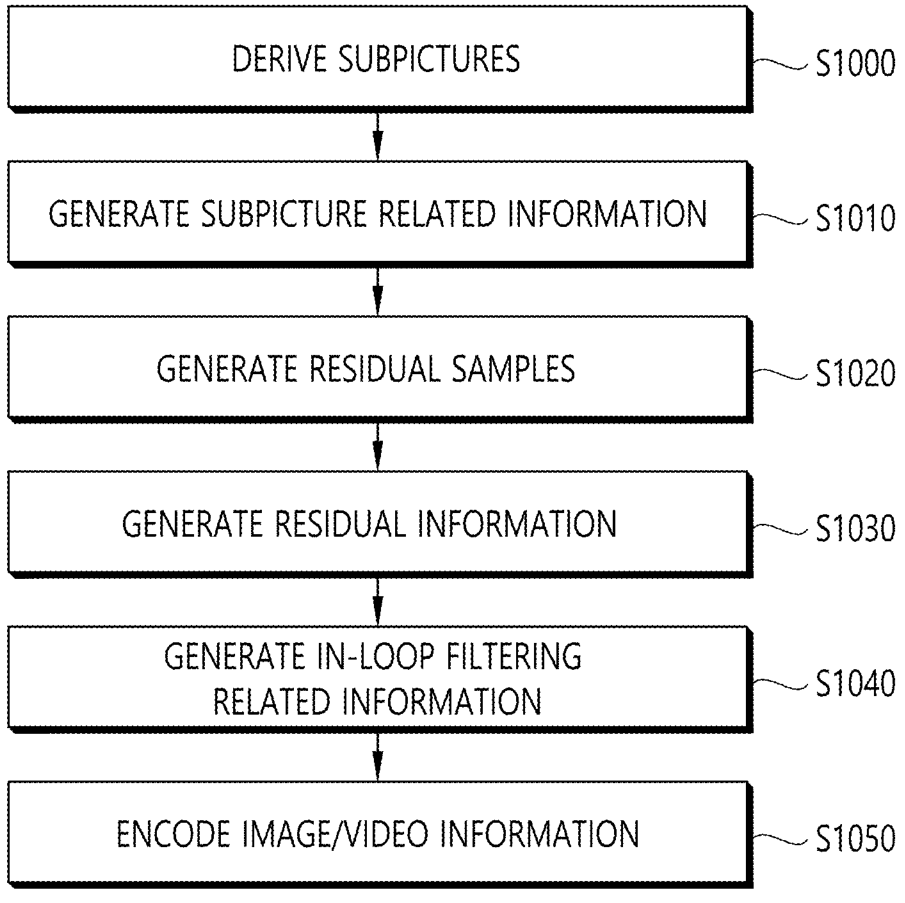
FIG. 10 and FIG. 11 schematically illustrate an example of a video/image encoding method and related components according to embodiment(s) of the present document.
Figure 11:
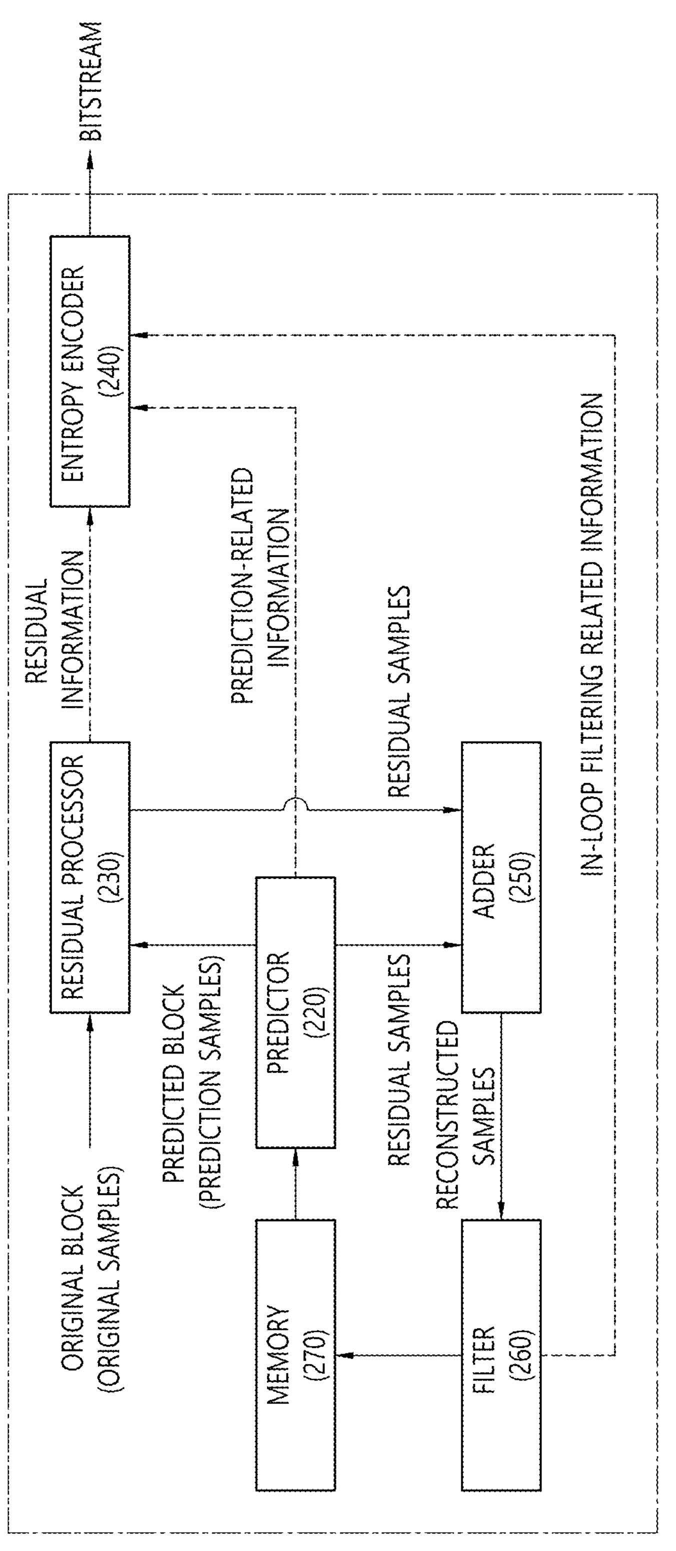

FIG. 10 and FIG. 11 schematically show an example of a video/image encoding method and related components according to embodiment(s) of the present document.

The method disclosed in FIG. 10 may be performed by an encoding apparatus disclosed in FIG. 2 or FIG. 11. Specifically, for example, S1000 and/or S1010 of FIG. 10 may be performed by a predictor 220, a residual processor 230, an adder 250, and/or a filter 260 of the encoding apparatus of FIGS. 11, S1020 and S1030 of FIG. 10 may be performed by a residual processor 230 of the encoding apparatus of FIG. 11, S1040 of FIG. 10 may be performed by a filter 260 of the encoding apparatus of FIG. 11, and S1050 of FIG. 10 may be performed by an entropy encoder 240 of the encoding apparatus of FIG. 11. Further, although not illustrated in FIG. 10, prediction samples or prediction related information may be derived by the predictor 220 of the encoding apparatus in FIG. 10, and a bitstream may be generated from residual information or prediction related information by the entropy encoder 240 of the encoding apparatus. The method disclosed in FIG. 10 may include the above-described embodiments of the present document.

Referring to FIG. 10, the encoding apparatus may derive subpictures (S1000). The encoding apparatus may divide the current picture into subpictures. The encoding apparatus may determine the size (e.g., height/width) of the subpictures. Further, the encoding apparatus may determine the number of subpicture(s) included in the current picture.

The encoding apparatus may generate subpicture related information (S1010). For example, the encoding apparatus may generate the subpicture related information based on the number of subpicture(s) included in the current picture, the size (e.g., height/width) of the subpictures, and/or boundaries of the subpictures. The subpicture related information may include information on whether the subpicture is present, information on whether the subpicture is treated as a picture, information about the number of subpicture(s) included in the current picture, information about the size (e.g., height/width) of the subpictures, information on whether the boundaries of the subpictures coincide with the boundary of the current picture, and/or information about IDs of the subpictures.

The encoding apparatus may derive residual samples (S1020). The encoding apparatus may derive the residual samples for the current block, and the residual samples for the current block may be derived based on the original samples and the prediction samples of the current block. Specifically, the encoding apparatus may derive the prediction samples of the current block based on a prediction mode. In this case, various prediction methods, such as inter prediction or intra prediction, disclosed in the present document may be applied. The residual samples may be derived based on the prediction samples and the original samples.

The encoding apparatus may derive transform coefficients. The encoding apparatus may derive the transform coefficients based on a transform procedure for the residual samples. For example, the transform procedure may include at least one of DCT, DST, GBT, or CNT.

The encoding apparatus may derive quantized transform coefficients. The encoding apparatus may derive the quantized transform coefficients based on a quantization procedure for the transform coefficients. The quantized transform coefficients may have a one-dimensional vector form based on a coefficient scan order.

The encoding apparatus may generate residual information (S1030). The encoding apparatus may generate the residual information based on the residual samples for the current block. The encoding apparatus may generate the residual information representing the quantized transform coefficients. The residual information may be generated through various encoding methods, such as exponential Golomb, CAVLC, and CABAC.

The encoding apparatus may generate reconstructed samples. The encoding apparatus may generate the reconstructed samples based on the residual information. The reconstructed samples may be generated by adding the residual samples based on the residual information to the prediction sample. Specifically, the encoding apparatus may perform prediction (intra or inter prediction) for the current block, and may generate the reconstructed samples based on the original samples and the prediction samples generated through the prediction.

The reconstructed samples may include reconstructed luma samples and reconstructed chroma samples. Specifically, the residual samples may include residual luma samples and residual chroma samples. The residual luma samples may be generated based on the original luma samples and prediction luma samples. The residual chroma samples may be generated based on the original chroma samples and prediction chroma samples. The encoding apparatus may derive transform coefficients (luma transform coefficients) for the residual luma samples and/or transform coefficients (chroma transform coefficients) for the residual chroma samples. The quantized transform coefficients may include quantized luma transform coefficients and/or quantized chroma transform coefficients.

The encoding apparatus may determine whether the in-loop filtering procedure is performed across the virtual boundaries. Based on the above determination, the encoding apparatus may generate information about the number of the virtual boundaries and the positions of the virtual boundaries. For example, the encoding apparatus may generate information about the number of vertical virtual boundaries, information about the positions of the vertical virtual boundaries, information about the number of horizontal virtual boundaries, and information about the positions of the horizontal virtual boundaries.

The encoding apparatus may generate in-loop filtering related information for the reconstructed samples of the current picture (S1040). The encoding apparatus may perform an in-loop filtering procedure for the reconstructed samples, and may generate the in-loop filtering related information based on the in-loop filtering procedure. For example, the in-loop filtering related information may include information about the virtual boundaries as described above in the present document (SPS virtual boundary enabled flag, picture header virtual boundary enabled flag, SPS virtual boundary present flag, picture header virtual boundary present flag, and information about the positions of the virtual boundaries). In an example, the encoding apparatus may generate the in-loop filtering related information based on the information about the number of the vertical virtual boundaries, the information about the positions of the vertical virtual boundaries, the information about the number of the horizontal virtual boundaries, and the information about the positions of the horizontal virtual boundaries.

The encoding apparatus may encode video/image information (S1050). The image information may include the residual information, the prediction related information, the subpicture related information, and/or the in-loop filtering related information. The encoded video/image information may be output in the form of a bitstream. The bitstream may be transmitted to the decoding apparatus through a network or a storage medium.

The image/video information may include various pieces of information according to an embodiment of the present document. For example, the image/video information may include information disclosed in at least one of the above-described Tables 1 to 12.

In an embodiment, the image information may include a sequence parameter set (SPS) and tile related information. Based on whether the SPS includes the subpicture related information, it may be determined whether the SPS includes additional information related to the virtual boundaries. The current picture may include tiles based on the tile related information. Further, the current picture may include subpictures based on the subpicture related information.

In an embodiment, the additional information related to the virtual boundaries may include the number of the virtual boundaries and the positions of the virtual boundaries.

In an embodiment, the additional information related to the virtual boundaries may include the information about the number of the vertical virtual boundaries, the information about the positions of the vertical virtual boundaries, the information about the number of the horizontal virtual boundaries, and the information about the positions of the horizontal virtual boundaries.

In an embodiment, the image information may include a subpicture present flag (e.g., subpic_present_flag). It may be determined whether the SPS includes the subpicture related information based on the subpicture present flag.

In an embodiment, the image information may include a subpicture ID present flag. Subpictures in the current picture may be independently coded subpictures based on the subpicture ID present flag. For example, if the value of the subpicture ID present flag is 1, the subpictures in the current picture may be independently coded subpictures.

In an embodiment, coding tree units (CTUs) in one tile may belong to the same subpicture.

In an embodiment, coding tree units (CTUs) in one subpicture may belong to the same tile.

In an embodiment, the SPS may include an SPS virtual boundary present flag related to whether the SPS includes the additional information related to the virtual boundaries. The value of the SPS virtual boundary present flag may be determined as 1 based on that the SPS includes the subpicture related information.

In an embodiment, the image information may include picture header information. Based on that the SPS includes the subpicture related information, the additional information related to the virtual boundaries may not be included in the picture header.

In an embodiment, based on that the SPS includes the subpicture related information, the SPS may include the additional information related to the virtual boundaries.

Figure 12:
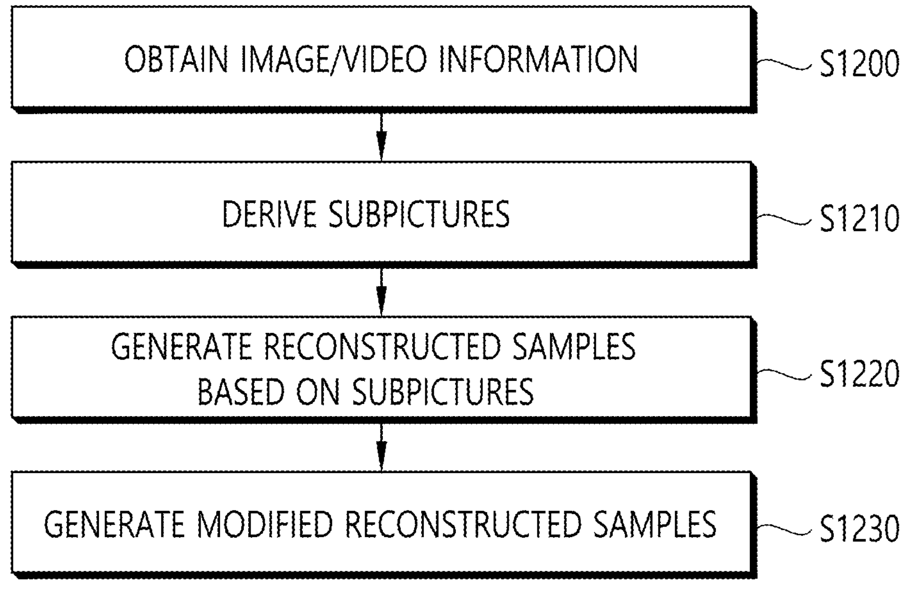
FIG. 12 and FIG. 13 schematically illustrate an example of an image/video decoding method and related components according to embodiment(s) of the present document.
Figure 13:
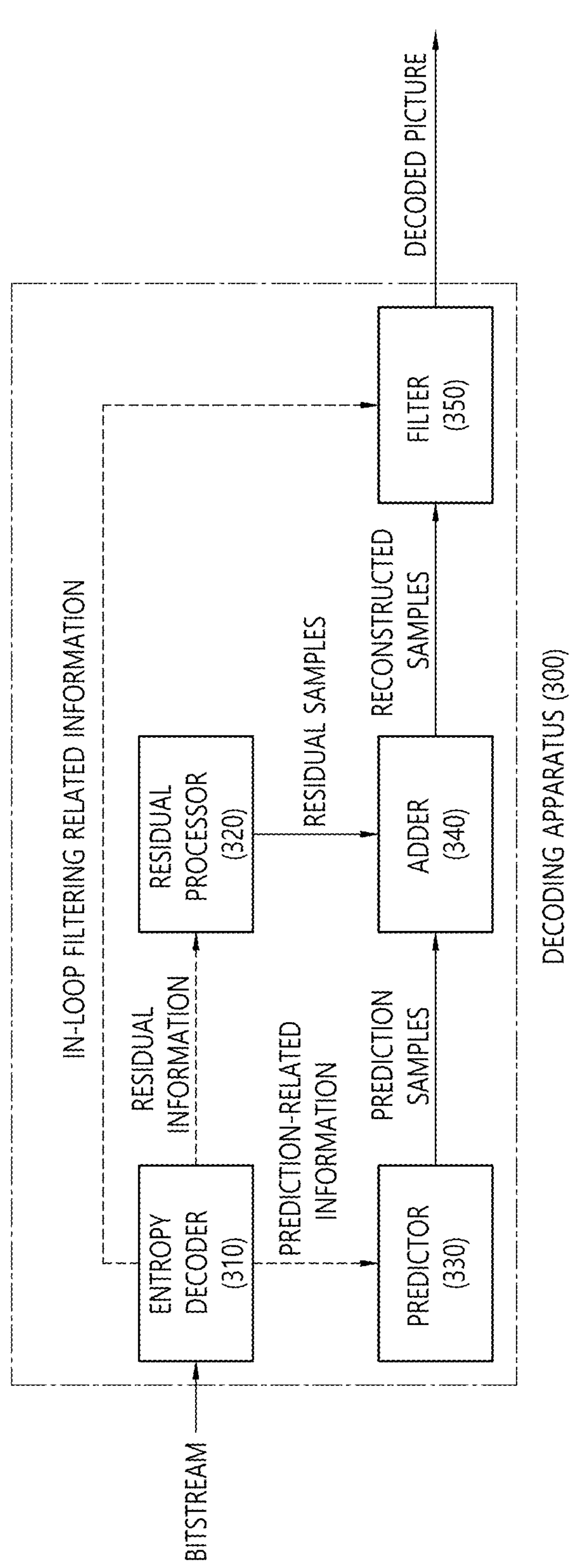

FIG. 12 and FIG. 13 schematically show an example of a video/image decoding method and related components according to embodiment(s) of the present document.

The method disclosed in FIG. 12 may be performed by a decoding apparatus disclosed in FIG. 12 or FIG. 13. Specifically, for example, S1200 of FIG. 12 may be performed by the entropy decoder 310 of the decoding apparatus, S1210 of FIG. 12 may be performed by the residual processor 320 and/or the predictor 330 of the decoding apparatus, S1220 may be performed by the residual processor 320 and/or the adder 340 of the decoding apparatus, and S1230 may be performed by the filter 350 of the decoding apparatus. The method disclosed in FIG. 12 may include the above-described embodiments in the present document.

Referring to FIG. 12, the decoding apparatus may receive/obtain video/image information (S1200). The video/image information may include residual information, prediction related information, subpicture related information, and/or in-loop filtering related information. The decoding apparatus may receive/obtain the image/video information through a bitstream.

The image/video information may include various pieces of information according to an embodiment of the present document. For example, the image/video information may include information disclosed in at least one of the above-described Tables 1 to 12.

The decoding apparatus may derive subpicture(s) for a current picture. The decoding apparatus may derive the subpicture(s) based on subpicture related information obtained based on the bitstream. Based on the subpicture related information, the number of subpicture(s), the size of the subpicture(s), and whether the subpicture(s) is treated as a picture may be determined. Residual samples and/or prediction samples to be described later may be generated based on the subpicture(s).

The decoding apparatus may derive quantized transform coefficients. The decoding apparatus may derive the quantized transform coefficients based on the residual information. The quantized transform coefficients may have a one-dimensional vector form based on a coefficient scan order. The quantized transform coefficients may include quantized luma transform coefficients and/or quantized chroma transform coefficients.

The decoding apparatus may derive transform coefficients. The decoding apparatus may derive the transform coefficients based on a dequantization procedure for the quantized transform coefficients. The decoding apparatus may derive luma transform coefficients through the dequantization based on the quantized luma transform coefficients. The decoding apparatus may derive chroma transform coefficients through the dequantization based on the quantized chroma transform coefficients.

The decoding apparatus may generate/derive residual samples. The decoding apparatus may derive the residual samples based on an inverse transform procedure for the transform coefficients. The decoding apparatus may derive residual luma samples through the inverse transform procedure based on the luma transform coefficients. The decoding apparatus may derive residual chroma samples through the inverse transform procedure based on the chroma transform coefficients.

The decoding apparatus may generate/derive reconstructed samples (S1220). For example, the decoding apparatus may generate/derive reconstructed luma samples and/or reconstructed chroma samples. The decoding apparatus may generate the reconstructed luma samples and/or the reconstructed chroma samples based on the residual information. The decoding apparatus may generate the reconstructed samples based on the residual information. The reconstructed samples may include the reconstructed luma samples and/or the reconstructed chroma samples. Luma components of the reconstructed sample may correspond to the reconstructed luma samples, and chroma components of the reconstructed samples may correspond to the reconstructed chroma samples. The decoding apparatus may generate prediction luma samples and/or prediction chroma samples through a prediction procedure. The decoding apparatus may generate the reconstructed luma samples based on the prediction luma samples and the residual luma samples. The decoding apparatus may generate the reconstructed chroma samples based on the prediction chroma samples and the residual chroma samples. In addition, the decoding apparatus may generate the reconstructed samples of the current picture based on the residual samples, the prediction samples, and/or the subpicture(s).

The decoding apparatus may generate modified (filtered) reconstructed samples (S1230). The decoding apparatus may generate the modified reconstructed samples based on the in-loop filtering procedure for the reconstructed samples. The decoding apparatus may generate the modified reconstructed samples based on the in-loop filtering related information. In order to generate the modified reconstructed samples, the decoding apparatus may use a deblocking procedure, an SAO procedure, and/or an ALF procedure.

In an embodiment, the image information may include a sequence parameter set (SPS) and tile related information. Based on whether the SPS includes the subpicture related information, it may be determined whether the SPS includes additional information related to the virtual boundaries. The current picture may include tiles based on the tile related information. Further, the current picture may include the subpictures based on the subpicture related information.

In an embodiment, the additional information related to the virtual boundaries may include the number of the virtual boundaries and the positions of the virtual boundaries.

In an embodiment, the additional information related to the virtual boundaries may include information about the number of vertical virtual boundaries, information about positions of the vertical virtual boundaries, information about the number of horizontal virtual boundaries, and information about positions of the horizontal virtual boundaries.

In an embodiment, the image information may include a subpicture present flag (e.g., subpic_present_flag). It may be determined whether the SPS includes the subpicture related information based on the subpicture present flag.

In an embodiment, the image information may include a subpicture ID present flag. Subpictures in the current picture may be independently coded subpictures based on the subpicture ID present flag. For example, if the value of the subpicture ID present flag is 1, the subpictures in the current picture may be independently coded subpictures.

In an embodiment, coding tree units (CTUs) in one tile may belong to the same subpicture.

In an embodiment, coding tree units (CTUs) in one subpicture may belong to the same tile.

In an embodiment, the SPS may include an SPS virtual boundary present flag related to whether the SPS includes the additional information related to the virtual boundaries. The value of the SPS virtual boundary present flag may be determined as 1 based on that the SPS includes the subpicture related information.

In an embodiment, the image information may include picture header information. Based on that the SPS includes the subpicture related information, the additional information related to the virtual boundaries may not be included in the picture header.

In an embodiment, based on that the SPS includes the subpicture related information, the SPS may include the additional information related to the virtual boundaries.

When the residual sample for the current block exists, the decoding apparatus may receive the information on the residual for the current block. The information on the residual may include the transform coefficients on the residual samples. The decoding apparatus may derive the residual samples (or residual sample array) for the current block based on the residual information. Specifically, the decoding apparatus may derive the quantized transform coefficients based on the residual information. The quantized transform coefficients may have a one-dimensional vector form based on a coefficient scan order. The decoding apparatus may derive the transform coefficients based on the dequantization process for the quantized transform coefficients. The decoding apparatus may derive the residual samples based on the transform coefficients.

The decoding apparatus may generate a reconstructed samples based on the (intra) prediction samples and residual samples, and may derive the reconstructed block or the reconstructed picture based on the reconstructed samples. Specifically, the decoding apparatus may generate reconstructed samples based on a sum between the (intra) prediction samples and the residual samples. Thereafter, as described above, the decoding apparatus may apply an in-loop filtering process such as deblocking filtering and/or SAO process to the reconstructed picture in order to improve the subjective/objective picture quality, if necessary.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VOD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 14:
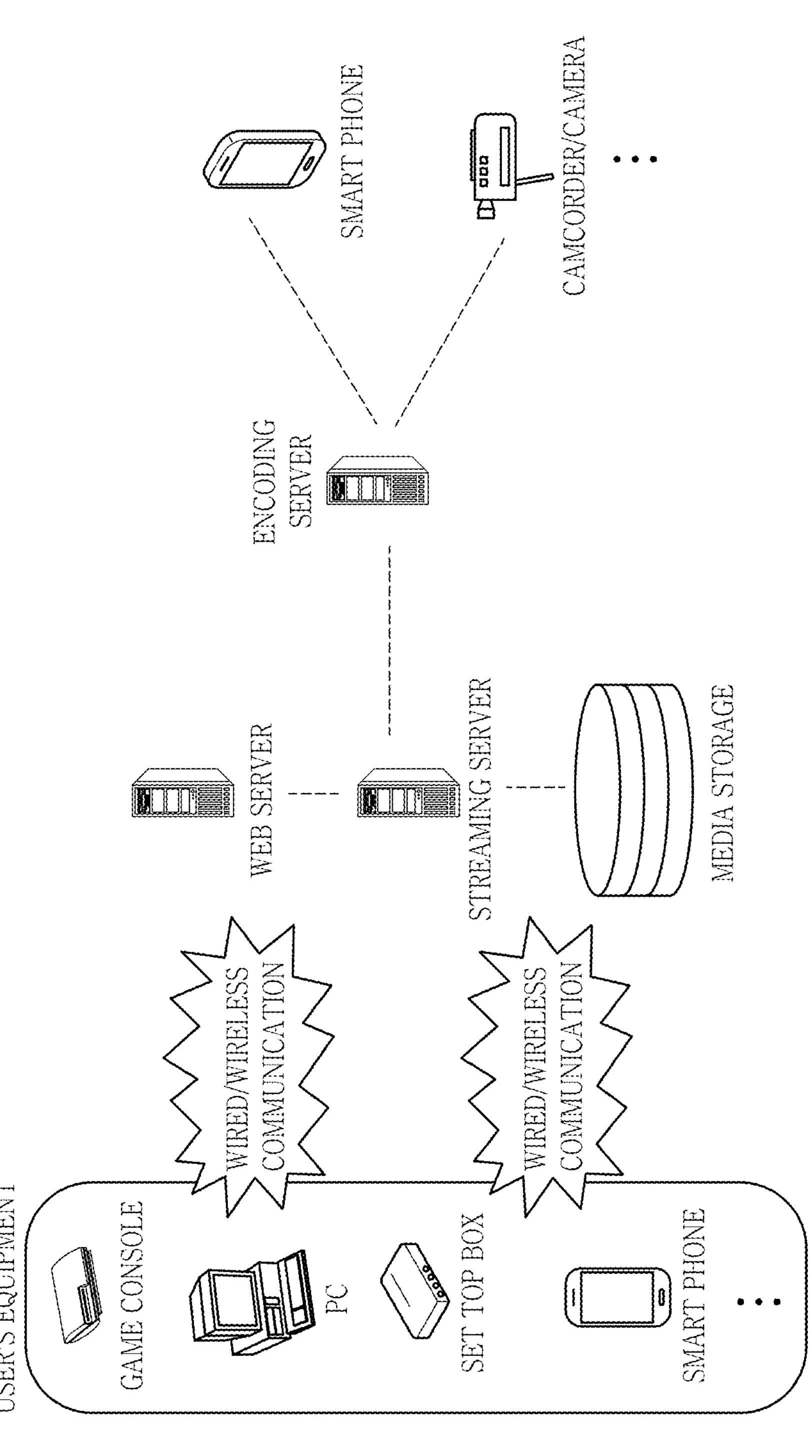
FIG. 14 illustrates an example of a content streaming system to which embodiments disclosed in the present document may be applied.

FIG. 14 represents an example of a contents streaming system to which the embodiment of the present document may be applied.

Referring to FIG. 14, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A decoding apparatus for image decoding, the decoding apparatus comprising:

a memory; and at least one processor connected to the memory, the at least one processor configured to:

obtain image information including residual information and subpicture related information through a bitstream;

derive subpictures for a current picture based on the subpicture related information;

generate reconstructed samples of the current picture based on the residual information and the subpictures; and generate modified reconstructed samples based on an in-loop filtering process for the reconstructed samples, wherein the image information includes a sequence parameter set (SPS) and tile related information, wherein the current picture includes the subpictures and tiles based on the subpicture related information and the tile related information, and wherein coding tree units (CTUs) included in one tile belong to a same subpicture, and CTUs included in one subpicture belong to a same tile.

2. The decoding apparatus of claim 1, wherein the image information comprises a subpicture present flag, and wherein whether the SPS includes the subpicture related information is determined based on the subpicture present flag.

3. An encoding apparatus for image encoding, the encoding apparatus comprising:

a memory; and at least one processor connected to the memory, the at least one processor configured to:

derive subpictures for a current block;

generate subpicture related information based on the subpictures;

derive residual samples for the current block;

generate residual information based on the residual samples for the current block;

generate in-loop filtering related information based on whether an in-loop filtering process is performed across virtual boundaries; and encode image information based on the subpicture related information, the residual information, and the in-loop filtering related information, wherein the image information includes a sequence parameter set (SPS) and tile related information, wherein the current picture includes the subpictures and tiles based on the subpicture related information and the tile related information, and wherein coding tree units (CTUs) included in one tile belong to a same subpicture, and CTUs included in one subpicture belong to a same tile.

4. The encoding apparatus of claim 3, wherein the image information comprises a subpicture present flag, and wherein whether the SPS includes the subpicture related information is determined based on the subpicture present flag.

5. An apparatus for transmitting data for an image, the apparatus comprising:

at least one processor configured to obtain a bitstream generated by an encoding method performed by an encoding apparatus for image encoding; and a transmitter configured to transmit the bitstream, wherein the encoding method comprising:

deriving subpictures for a current block;

generating subpicture related information based on the subpictures;

deriving residual samples for the current block;

generating residual information based on the residual samples for the current block;

generating in-loop filtering related information based on whether an in-loop filtering process is performed across virtual boundaries; and encoding image information based on the subpicture related information, the residual information, and the in-loop filtering related information, wherein the image information includes a sequence parameter set (SPS) and tile related information, wherein the current picture includes the subpictures and tiles based on the subpicture related information and the tile related information, and wherein coding tree units (CTUs) included in one tile belong to a same subpicture, and CTUs included in one subpicture belong to a same tile.

* * * * *